United States Patent [19]

Tapper et al.

[11] Patent Number: 5,147,625
[45] Date of Patent: Sep. 15, 1992

[54] PROCESS FOR THE PREPARATION OF PHOSPHOROUS ACID

[75] Inventors: Alexander Tapper, Mönchengladbach; Horst Buhl; Josef Holz, both of Erftstadt, all of Fed. Rep. of Germany

[73] Assignee: Hoechst Aktiengesellschaft, Frankfurt am Maiin, Fed. Rep. of Germany

[21] Appl. No.: 739,873

[22] Filed: Aug. 2, 1991

[30] Foreign Application Priority Data

Aug. 16, 1990 [DE] Fed. Rep. of Germany ....... 4025937

[51] Int. Cl.$^5$ .................. C01B 25/16; C01B 7/01
[52] U.S. Cl. .................. 423/316; 423/307; 423/481
[58] Field of Search ............. 423/316, 307, 481

[56] References Cited

U.S. PATENT DOCUMENTS 2,670,274  2/1954  Jones .................. 423/316
2,684,286  7/1954  Krieger ................ 423/316

FOREIGN PATENT DOCUMENTS 1042551  11/1958  Fed. Rep. of Germany .
1214039   4/1960  France .

*Primary Examiner*—Gregory A. Heller
*Attorney, Agent, or Firm*—Connolly & Hutz

[57] ABSTRACT

In a continuous process for the preparation of phosphorous acid with simultaneous production of hydrochloric acid, a reaction zone is provided which is in open communication with a first scrubbing zone. A portion of the reaction product is recycled from the bottom of the reaction zone into the top of the scrubbing zone and phosphorous acid is removed from the circulation. Hydrogen chloride gas escaping from the top of the first scrubbing zone is brought into contact, in a cooled, second scrubbing zone, with an overstoichiometric amount of water. Hydrochloric acid is obtained which is passed as starting material into the reaction zone or into the top of the first scrubbing zone. The external cooling of the second scrubbing zone is controlled such that the temperature in the reaction zone is kept constant at a desired value between 90° and 130° C. without adding any external cooling or heating energy. Pure hydrochloric acid is recovered in an absorption zone.

7 Claims, 1 Drawing Sheet

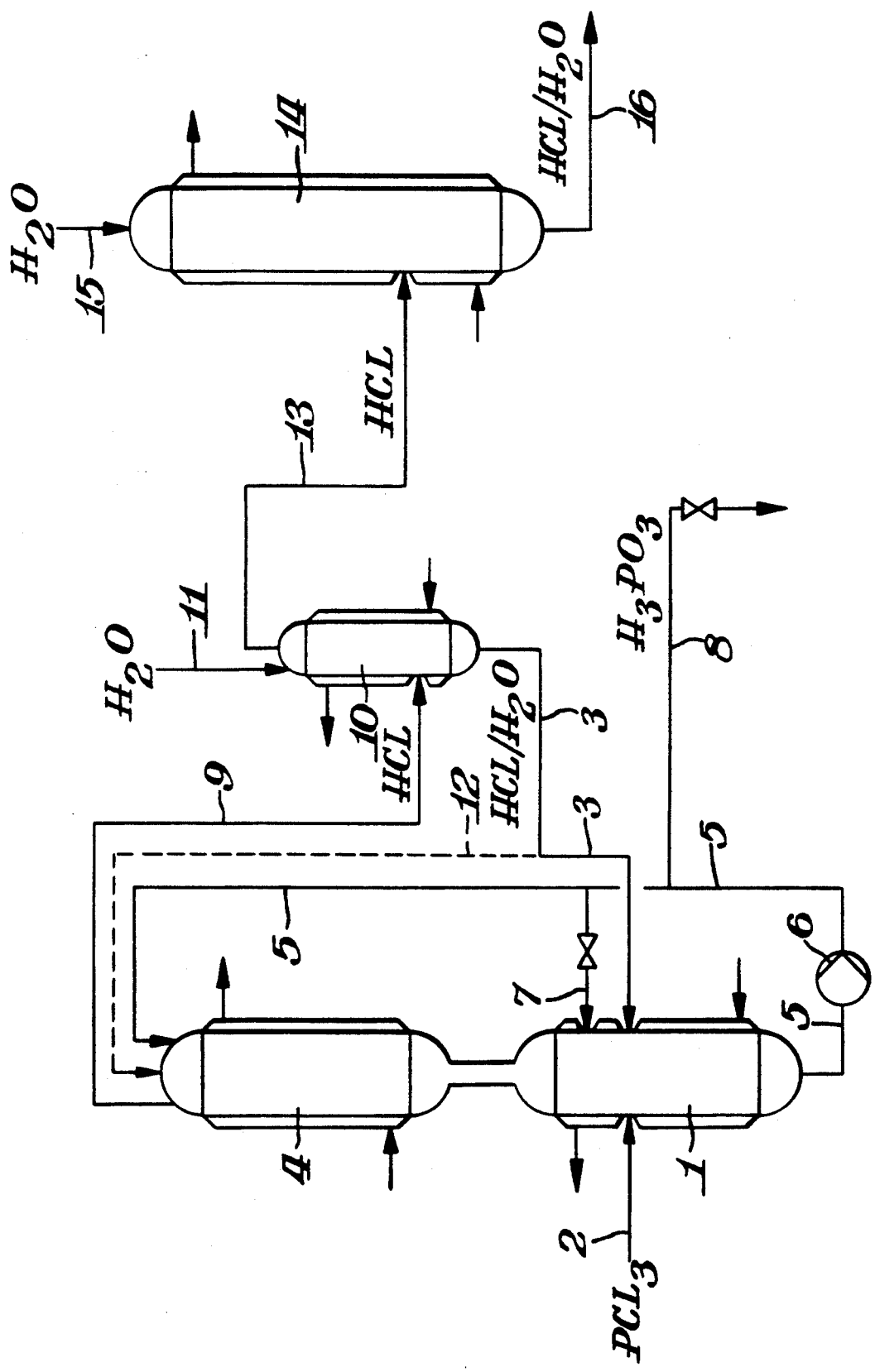

PROCESS FOR THE PREPARATION OF PHOSPHOROUS ACID

The preparation of phosphorous acid ($H_3PO_3$, more recently also called phosphonic acid) by hydrolysis of phosphorus trichloride ($PCl_3$) is known. However, when the reaction is carried out in industry, the following circumstances give rise to problems:

a) liberation of a large heat of reaction

According to the heat balance, the reaction can be divided into two partial reactions:

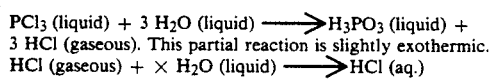

$PCl_3$ (liquid) + 3 $H_2O$ (liquid) ⟶ $H_3PO_3$ (liquid) + 3 HCl (gaseous). This partial reaction is slightly exothermic.
HCl (gaseous) + x $H_2O$ (liquid) ⟶ HCl (aq.)

The dissolution of gaseous hydrogen chloride in water is a strongly exothermic reaction.

The resulting high temperatures lead to undesired side reactions. Since the larger portion of the amount of heat liberated is caused by the heat of dissolution of the hydrogen chloride gas, DE-AS No. 1,042,551 has proposed to carry out the hydrolysis of $PCl_3$ with concentrated, fuming hydrochloric acid. The amount of heat liberated during hydrolysis of $PCl_3$ was intended to compensate the amount of heat used for removing the hydrogen chloride gas introduced in this manner. However, in contrast to statements made in DE-AS No. 1,042,551 to this effect, the overall reaction in fact becomes strongly endothermic, so that energy must constantly be introduced. Besides, according to DE-AS No. 1,042,551, the hydrolysis is carried out at temperatures below 25° C. The process can also be carried out continuously.

b) poor miscibility of the reactants (bottom layer formation and local overheating)

Due to the difference in density between $PCl_3$ and water and dilute phosphorous acid, there is always a risk of bottom layer formation, with sudden uncontrolled reaction. According to French Pat. No. 1,214,039, this risk is prevented by carrying out the reaction at a temperature above the boiling point of $PCl_3$ (76° C.). Nevertheless, the formation of decomposition products is often observed, owing to local fairly high concentrations of $PCl_3$. According to French Pat. No. 1,214,039, $PCl_3$ is introduced into a reaction column (packed column) at temperatures of 80° to 100° C. The reaction column is fitted with a second heated packed column on top, through which a mixture comprising recycled reaction mixture and water trickles downward. At the bottom of the reaction column, crude reaction product ($H_3PO_3$) is constantly removed and some of it is recycled into the top of the upper packed column, while the remainder is worked up to give pure $H_3PO_3$. The HCl gas formed is discharged at the top of the upper packed column. A stoichiometric amount of water is added to the recycled reaction mixture shortly before it enters the upper packed column.

c) $PCl_3$ losses via the gas phase

In the processes used in industry, a portion of the $PCl_3$ used is always entrained by the hydrogen chloride gas formed in the reaction and thus enters the HCl absorption stage. Apart from the diminished economy caused by this, this contamination greatly reduces the sale value of the concentrated hydrochloric acid obtained. U.S. Pat. No. 2,684,286 describes a continuous process for the preparation of $H_3PO_3$ by hydrolysis of $PCl_3$ with a 20 to 40% stoichiometric excess of water at temperatures below 76° C., preferably at 40° to 60° C. In this process, the starting materials are introduced into an initially introduced mixture comprising $H_3PO_3$ and hydrochloric acid. The hydrogen chloride gas escaping at the top of the reaction vessel is recovered but usually still contains some $PCl_3$.

The object of the present invention is to avoid the difficulties encountered in the known processes and to provide a solution for the problems mentioned.

The invention relates to a continuous process for the preparation of phosphorous acid with simultaneous production of hydrochloric acid by hydrolysis of phosphorus trichloride with aqueous hydrochloric acid at elevated temperature in a reaction zone charged with the reaction products, which zone is in open communication with a first scrubbing zone arranged on top of it, a portion of the reaction product being recycled from the bottom of the reaction zone into the top of the scrubbing zones, while hydrogen chloride gas is discharged from the top of the first scrubbing zone and phosphorous acid is removed from the circulation, which process comprises, in order to prepare a 60 to 110% by weight phosphorous acid, calculated as $H_3PO_3$ equivalent, with simultaneous production of a pure, 20.2 to 42% by weight hydrochloric acid, bringing the hydrogen chloride gas escaping from the top of the first scrubbing zone into contact, in a cooled, second scrubbing zone, with an over-stoichiometric amount of water, calculated relative to the amount of phosphorus trichloride fed into the reaction zone, and, depending on the extent of external cooling of the second scrubbing zone to an internal temperature of 80° to 110° C., obtaining a 32 to 20.2% by weight hydrochloric acid, which is passed as starting material into the reaction zone or into the top of the first scrubbing zone, the external cooling of the second scrubbing zone, while taking into account that the less the second scrubbing zone is cooled from outside the lower the concentration of hydrochloric acid in the second scrubbing zone and consequently the higher the temperature in the reaction zone — and vice versa — being controlled such that the temperature in the reaction zone is kept constant at a desired value between 90° and 130° C. without introducing any external cooling or heating energy, and obtaining a pure, 20.2 to 42% by weight hydrochloric acid in an optionally cooled absorption zone with the addition of water from the excess hydrogen chloride gas which is newly formed in each reaction and escapes in undissolved form at the top of the second scrubbing zone together with excess water vapor.

In addition, the process of the invention can preferably and alternatively comprise a) obtaining a 30 to 36% by weight hydrochloric acid in the absorption zone, b) introducing into the second scrubbing zone a dilute phosphorous acid preferably containing less than 70% by weight of $H_3PO_3$ as the water of reaction, c) recycling a portion of the reaction product from the bottom of the reaction zone into the upper half thereof, d) introducing the portion of the reaction product recycled from the bottom of the reaction zone into the upper half thereof below the surface of the reaction product tangentially to the wall of the reaction zone, e) freeing the phosphorous acid removed from the recirculated reaction product from hydrogen chloride and water by stripping or concentrating under reduced pressure.

A more than 100% by weight phosphorous acid, calculated as $H_3PO_3$ equivalent, is understood to mean a phosphorous acid containing substantial portions of pyrophosphorous acid ($H_4P_2O_5$, which used to be called diphosphorous acid and is now called diphosphonic acid) and producing, upon addition of (at least) stoichiometric amounts of water at room temperature or more rapidly at elevated temperature, an (at most) 100% by weight phosphorous acid ($H_3PO_3$). For example, 100 g of a 110% by weight phosphorous acid comprise only 19 g of $H_3PO_3$ in addition to 81 g of $H_4P_2O_5$. Upon addition of 10 g of $H_2O$, which corresponds to the stoichiometrically equivalent amount, the 81 g of $H_4P_2O_5$ give 91 g of $H_3PO_3$, so that a total of 110 g of a 100% by weight $H_3PO_3$ solution is obtained.

Carrying out the process of the invention has the following advantages:

1. it is possible to prepare phosphorous acid, either pure or in a mixture with pyrophosphorous acid, in a wide concentration range, i.e. from 60 to 110% by weight;
2. by varying the concentration of the aqueous hydrochloric acid used for hydrolysis between 20.2 and 32% by weight, a good control of the total heat balance in the reaction vessel is possible;
3. very good thorough mixing of the reactor contents is ensured;
4. no $PCl_3$ losses are observed, so that a pure concentrated 20.2 to 42% by weight hydrochloric acid can be prepared from the pure HCl gas formed in the hydrolysis of $PCl_3$.

The process of the invention will be illustrated in more detail below with reference to the accompanying drawing:

$PCl_3$ via line 2 and a 20.2 to 32% by weight hydrochloric acid via line 3 are simultaneously introduced in approximately stoichiometric amounts into the upper half of the heatable reactor 1, in which a phosphorous acid of the desired concentration between 60 and 110% by weight (calculated as $H_3PO_3$ equivalent) saturated with HCl gas is present, below the surface of the initially introduced phosphorous acid. The temperature in reactor 1 is maintained at 90° to 130° C. The lower the concentration and the higher the temperature of the initially introduced phosphorous acid, the higher the conversion of $PCl_3$. However, it is at least 75%.

The HCl gas formed in the reaction and usually entrained residual amounts of $PCl_3$ escape from the top of the reactor 1 and enter the heatable first scrubbing column 4, which is filled with packing. Reaction mixture is continuously removed at the bottom of reactor 1 and recycled via the heated line 5 by means of the pump 6 into the top of the scrubbing column 4. In this manner, the residual amounts of $PCl_3$ in the scrubbing column 4 are hydrolyzed to $H_3PO_3$ and returned to the reactor 1. Reaction mixture is continuously removed from line 5 via the heated branch line 7 and recycled into the upper half of the reactor 1, thus ensuring good thorough mixing of the reactor contents, which can be further improved by moving the inlet port of the line 7 into the reactor 1 below the surface of the reaction product tangentially to the reactor wall. However, the good thorough mixing required can also be achieved by installing and operating a stirrer in reactor 1.

Reaction mixture is furthermore continuously removed from line 5 via the heated branch line 8, and is processed to give pure phosphorous acid of a desired concentration between 60 and 110% by weight, calculated as $H_3PO_3$ equivalent. Water and HCl are preferably separated off by stripping with inert gas or under reduced pressure.

The HCl gas scrubbed in the scrubbing column 4 flows via line 9 into the second scrubbing column 10 chargeable with cooling water. The scrubbing column 10 is charged from line 11 with an over-stoichiometric amount of water, calculated relative to the amount of $PCl_3$ introduced into the reactor 1. Any residual amounts of $PCl_3$ still present in the HCl gas stream are converted in the scrubbing column 10 to $H_3PO_3$. The spatial separation of $H_2O$ addition (in the scrubbing column 10) from $PCl_3$ addition (in the reactor 1) has, apart from the virtually quantitative removal of $PCl_3$ from the reaction gases, the additional advantage that by varying the cooling of this scrubbing column 10 between about 80° and 110° C. the concentration of the hydrochloric acid formed here from the HCl gas stream and the water can be varied in a simple manner within wide limits between 20.2 and 32% by weight of HCl. The hydrochloric acid concentration is about 32% by weight when cooled to about 80° C. and about 20.2% by weight when cooled to about 110° C. This hydrochloric acid is continuously fed into the reactor 1 via line 3 for hydrolysis of the $PCl_3$ used. By setting the temperature to a certain value of from 80° to 110° C. and thus the hydrochloric acid to a certain concentration (20.2 to 32% by weight) in the scrubbing column 10, the amount of heat liberated in the reactor 1 during hydrolysis of $PCl_3$ can exactly compensate the amount of heat required for removing the amount of HCl fed in.

The hydrochloric acid can also be fed into the top of the first scrubbing column 4 via the lines 3 and 12 instead of into the reactor 1 via line 3. This is advantageous if, for example, due to a high concentration (>90% by weight) of the phosphorous acid present in the reactor 1, the conversion of $PC_3$ in the reactor 1 is only between 75 and 85% and accordingly a fairly large amount of the unconverted $PCl_3$ rises into the scrubbing column 4 and has to be scrubbed there (with hydrolysis to $H_3PO_3$) and returned.

Good results can also be achieved by using a dilute aqueous solution of phosphorous acid via line 11 instead of pure water. In this manner, the process of the invention can at the same time also serve for concentrating dilute phosphorous acid.

The almost pure HCl gas remaining after the second scrubbing column 10 flows together with excess water vapor via line 13 into the absorption column 14 which is filled with packing and, if desired, cooled and sprayed at the top with water via line 15. Depending on the amount of water, a 20.2 to 42% by weight pure hydrochloric acid can be discharged from the bottom of absorption column 14 via line 16.

EXAMPLE 1

The reactor 1 contains a HCl-saturated 88.7% aqueous $H_3PO_3$ solution at a temperature of 97° C. A uniform filling level in the reactor 1 is ensured by metering 16.0 kg/h of phosphorus trichloride into the reactor 1 via line 2 and 8.0 kg/h of water into the second scrubbing column 10 via line 11 while simultaneously removing product via line 8. At the same time, at a cooling water feed of 0.07 m³/h into the jacket of the second scrubbing column 10, a temperature of 94° C. is reached in the interior of 10. After equilibrium has been reached (about 1 h), the heating/cooling of the reactor 1 and of the first scrubbing column 4 are switched off. After about a further hour, a new stationary state is reached; the reactor temperature is 107°-109° C. and remains constant during the further duration of the experiment (12 h) without introducing any external cooling or heating energy. The temperature in the second scrubbing column 10 is still 94° C., and the concentration of hydrochloric acid is 28.9% (line 3).

Over the entire duration of the experiment, 10.8 kg/h of reaction product comprising 88.7% of $H_3PO_3$, 8.4% of $H_2O$ and 2.9% of HCl are removed from recirculation (line 5) via line 8. Concentrating at 140° C. and 50 mbar substantially removes hydrogen chloride and water and gives 9.65 kg/h of $H_3PO_3$ (99%). The addition of 23.0 kg/h of $H_2O$ via line 15 to the cooled absorption stage 14 gives 36.2 kg/h of a 34.3% hydrochloric acid (line 16).

EXAMPLE 2 (COMPARATIVE EXAMPLE)

Under otherwise identical preconditions as in Example 1, the amount of cooling water used in the second scrubbing column 10 is 0.40 m³/h; this gives an internal temperature of 63° C. and a hydrochloric acid concentration of 35.1%. After 1 h, heating of the reactor 1 and the first scrubbing column 4 is switched off. A rapid decrease in the reactor temperature is observed, so that after 12 min an internal temperature in reactor 1 of 90° C. is measured. After reaching a temperature of 78° C. (after 35 min), the experiment was discontinued, since in the presence of liquid phosphorus trichloride there is a risk of bottom layer formation with sudden uncontrolled reaction, due to the difference in density between $PCl_3$ and water and dilute phosphorous acid.

We claim:

1. A continuous process for the preparation of a 60 to 110% by weight phosphorous acid, calculated as $H_3PO_3$ equivalent, with simultaneous production of a pure, 20.2 to 42% by weight hydrochloric acid, which comprises hydrolyzing phosphorus trichloride with aqueous hydrochloric acid in a reaction zone charged with the reaction products, which reaction zone is in open communication with a first scrubbing zone arranged on top of it, a portion of the reaction product being recycled from the bottom of the reaction zone into the top of the scrubbing zone, while phosphorus acid is removed from recirculation; bringing the hydrogen chloride gas escaping from the top of the first scrubbing zone into contact, in a cooled, second scrubbing zone, with an over-stoichiometric amount of water, calculated relative to the amount of phosphorus trichloride fed into the reaction zone, and, depending on the extent of external cooling of the second scrubbing zone to an internal temperature of 80 to 110° C., obtaining a 32 to 20.2% by weight hydrochloric acid, which is passed as starting material into the reaction zone or into the top of the first scrubbing zone, the temperature in the reaction zone being kept constant at a desired value from 90° to 130° C., without introducing any external cooling or heating energy, by controlling the external cooling of the second scrubbing zone; and obtaining a pure, 20.2 to 42% by weight hydrochloric acid in an absorption zone with the addition of water from the excess hydrogen chloride gas newly formed in each reaction and escaping in undissolved form at the top of the second scrubbing zone together with excess water vapor.

2. The process as claimed in claim 1, wherein a 30 to 36% by weight hydrochloric acid is obtained in the absorption zone.

3. The process as claimed in claim 1, wherein a dilute phosphorous acid containing less than 70% by weight of $H_3PO_3$ is introduced into the second scrubbing zone as water of reaction.

4. The process as claimed in claim 1, wherein a portion of the reaction product is recycled from the bottom of the reaction zone into the upper half thereof.

5. The process as claimed in claim 1, wherein the portion of the reaction product recycled from the bottom of the reaction zone into the upper half thereof is introduced below the surface of the reaction product tangentially to the wall of the reaction zone.

6. The process as claimed in claim 1, wherein the phosphorous acid removed from the recirculated reaction product is freed from hydrogen chloride and water by stripping or concentrating under reduced pressure.

7. The process as claimed in claim 1, wherein the absorption zone is cooled.

* * * * *